United States Patent
Lee et al.

(10) Patent No.: US 7,877,232 B2
(45) Date of Patent: Jan. 25, 2011

(54) METRIC BASED PERFORMANCE MONITORING METHOD AND SYSTEM

(75) Inventors: Joseph Ching Hua Lee, Singapore (SG); Sharad Vishwasrao, Singapore (SG); Naveen Kashyap, Bangalore (IN); Emelin Ornelas, Caracas (VE)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 12/229,980

(22) Filed: Aug. 27, 2008

(65) Prior Publication Data

US 2009/0105865 A1    Apr. 23, 2009

(30) Foreign Application Priority Data

Oct. 18, 2007    (SG)    ............................. 200717024-4

(51) Int. Cl.
*G06F 11/30* (2006.01)
*G06F 19/00* (2006.01)

(52) U.S. Cl. ..................................................... 702/183

(58) Field of Classification Search .................. 702/81, 702/82, 84, 182–185; 700/108–111, 117; 714/25, 47; 705/11
See application file for complete search history.

(56) References Cited

U.S. PATENT DOCUMENTS

| | | | |
|---|---|---|---|
| 5,067,099 A | 11/1991 | McCown et al. | |
| 6,666,049 B1* | 12/2003 | Katende et al. | 62/656 |
| 2004/0039968 A1* | 2/2004 | Hatonen et al. | 714/39 |
| 2005/0049831 A1* | 3/2005 | Lilly | 702/182 |
| 2005/0091102 A1* | 4/2005 | Retsina | 705/10 |
| 2005/0143953 A1* | 6/2005 | Retsina | 702/182 |
| 2007/0002295 A1* | 1/2007 | Reuhman-Huisken et al. | 355/53 |

FOREIGN PATENT DOCUMENTS

| | | |
|---|---|---|
| EP | 0379896 A2 | 8/1990 |
| EP | 0559305 A2 | 9/1993 |
| EP | 1286028 A2 | 2/2003 |
| WO | 2005/101740 A1 | 10/2005 |

OTHER PUBLICATIONS

Jovan, etl al. "Use of Key Performance Indicators in Production Management", Jun. 2006, IEEE, pp. 1-6.*
Singapore Search and Examination Report dated Mar. 26, 2010, issued in corresponding Singapore Patent Application No. 200717024-4.

* cited by examiner

*Primary Examiner*—Cindy Hien-Dieu Khuu
(74) *Attorney, Agent, or Firm*—Westerman, Hattori, Daniels & Adrian, LLP

(57) ABSTRACT

A metric based performance monitoring a process control system is disclosed in which diagnostics are performed at multiple levels of the plant, results of the diagnostics converted into Key Performance Indicators and compared to predetermined benchmarks such that an integrated and overall determination of the plants' performance may be displayed.

7 Claims, 6 Drawing Sheets

Management View

| | | |
|---|---|---|
| Available Production Time (hours) | 3207 | Theoretical Production Time - Turnaround Time |
| Turnaround Time (hours) | 84.13 | Duration of Turnaround |
| Overall Quality Factor (%) | 96.10 | Percentage of production conforming to quality |
| Machine Downtime (hours) | 69.55 | Sum total of all short stoppages |

Overall Equipment Effectiveness

| | Target | Current | Prev. Week | Remarks |
|---|---|---|---|---|
| Overall Availability(%) (Plant Level) | 94.50 | 86.12 | 84.31 | Improving |
| Overall Performance(%) (Plant Level) | 83.00 | 84.13 | 83.10 | Excellent |
| Overall Equipment Effectiveness(%) | 83.16 | 69.55 | 64.12 | Improving |

Maintenance KPI

| | | | | |
|---|---|---|---|---|
| Upkeep Effectiveness(%) | 98.00 | 73.12 | 72.00 | Improving |
| Turnaround Effectiveness(%) | 95.00 | 88.23 | 89.94 | Deteriorating |
| Maintenance Effectiveness(%) | 96.00 | 84.23 | 82.81 | Improving |

FIG. 3

Engineer's / Planner's View

InsightSuite KPI Performance Ranking - Actor List

Bad Actors - Controllability Deviation Time

Rank By: Controllability Deviation Time

- AvailableHours
- Maintenance Loops
- Number of Failures
- Time in preferred Mode
- Time In Normal Mode
- FailureTime
- Controllability Deviation Time
- Percentage of Time in Area
- Number of Stoppages
- Time in control(Excellent and Good)

Number Of Ranks: 10

Ranking Order
- ⦿ Worst Performers
- ◯ Best Performers

Export To Excel

Ranklist For Controllability Deviation Time On 11 Sep, 2007

| Rank | Tagname | Description | Controllability Deviation Time |
|---|---|---|---|
| 1 | FCV-314M | | 100 |
| 1 | TCV-410-3M | | 100 |
| 1 | TCV-410-1M | | 100 |
| 1 | TCV-415-7N | | 100 |
| 1 | TCV-410-4N | | 100 |

FIG. 4

Technician's / Operator's View

Diagnostics For 92FCV104
Time Of Last Update : 8:56:58

| Availability | Controllability | Hunting | Packing |

| Inadequate Air | Jamming |

FIG. 5

METRIC BASED PERFORMANCE MONITORING METHOD AND SYSTEM

FIELD

The present invention relates to performance monitoring systems, and particularly systems designed for use in process plants.

BACKGROUND OF THE INVENTION

Process plants such as chemical and petrochemical plants comprise hundreds of thousands of interrelated components ranging from individual devices, such as control valves, to complex plant equipment such as multi-stage compressors and heat exchangers, for example. Each of these components must operate continuously in a safe, efficient and effective mode in order for the entire plant to operate within predetermined levels of safety, quality and production.

Accordingly, hundreds of such devices, loops and equipment are required to effectively control the plant, and in turn, these assets must be constantly monitored for their optimal operations.

Countless prior art performance monitoring systems have been devised as attempted solutions, but all have had serious shortcomings and/or created problems themselves. For example, those based only on Key Performance Indicators (KPIs) do not produce an integrated presentation of the necessary information since they concentrate only on the process control loop level. Similarly, other systems focus on higher, supervising levels, but only by measuring against past performance and projected targets. These systems are not seamlessly integrated into the operation and maintenance layers, as does the present invention whereby an integrated and comprehensive view is provided of the total plant performance at the device level, control loop level and equipment level.

Moreover, while there have been prior loop and device performance monitoring systems, such prior systems have required highly skilled operators to interpret the results, and the results do not directly tie to the KPIs currently in use as does the system of the present invention. Other prior attempts have suffered from converting data overload problems for the operators into information overload problems, whereas the system of the present invention normalizes the complex results into only 3 states such as, for example, "Excellent", "Good/Deteriorating" and "Bad". Further, these can be colour coded so that highly skilled operators are not required, and errors of interpretation are avoided.

By way of example, a typical scenario is illustrated in FIG. 1 wherein a production run is started at 40 and the production 42 continues, while quality checks 44 are performed, until the product is detected to be offspec as indicated at 46. The operator then begins a trouble shooting program 48 in an effort to determine the cause of the problem. As illustrated by way of example, the problem may involve the PID (Proportional-Integrated-Derivative) tuning 50, or the APC (Advanced Process Control) 52 may have become inactive, or a breakdown 52 may have occurred. Only after this determination is made can the problem be corrected, which may involve unacceptable downtime and/or loss of product before production may be resumed.

Contrary to this conventional approach, the performance monitoring control system of the present invention compares all of the sensed conditions, at three different levels as will be more fully explained hereinafter, and produces an integrated, overall and deterministic presentation to the operators. In addition, the complete presentation may be broken down into information segments of particular concern to different classes of plant personnel such as, for example, maintenance, operations, and management.

Other problems of prior art systems include such disadvantages as being limited to the diagnostics of the component supplier, or discounting the current health of the existing equipment and relying only on periodic maintenance, or an over reliance on RBI (Risk-Based Inspection) and RCM (Reliability Centered Maintenance) analysis rather than immediate identification a problem or potential problem before it occurs. These and other problems of prior art systems are solved by the present invention, along with providing other substantial advantages as will become clear from the following description of one preferred embodiment of the present invention.

SUMMARY

The present invention comprises a system and method for monitoring the performance of a plant including performing diagnostics at more than one level of the plant, converting results of the diagnostics into KPIs, comparing the KPIs against predetermined benchmarks and providing integrated information as to the acceptability level of the plants' performance.

BRIEF DESCRIPTION OF DRAWINGS

FIGS. 3-5 are illustrative examples of the displays of information which may be provided by the present invention to different types of personnel involved in the plant operation;

DETAILED DESCRIPTION

Figure 1:
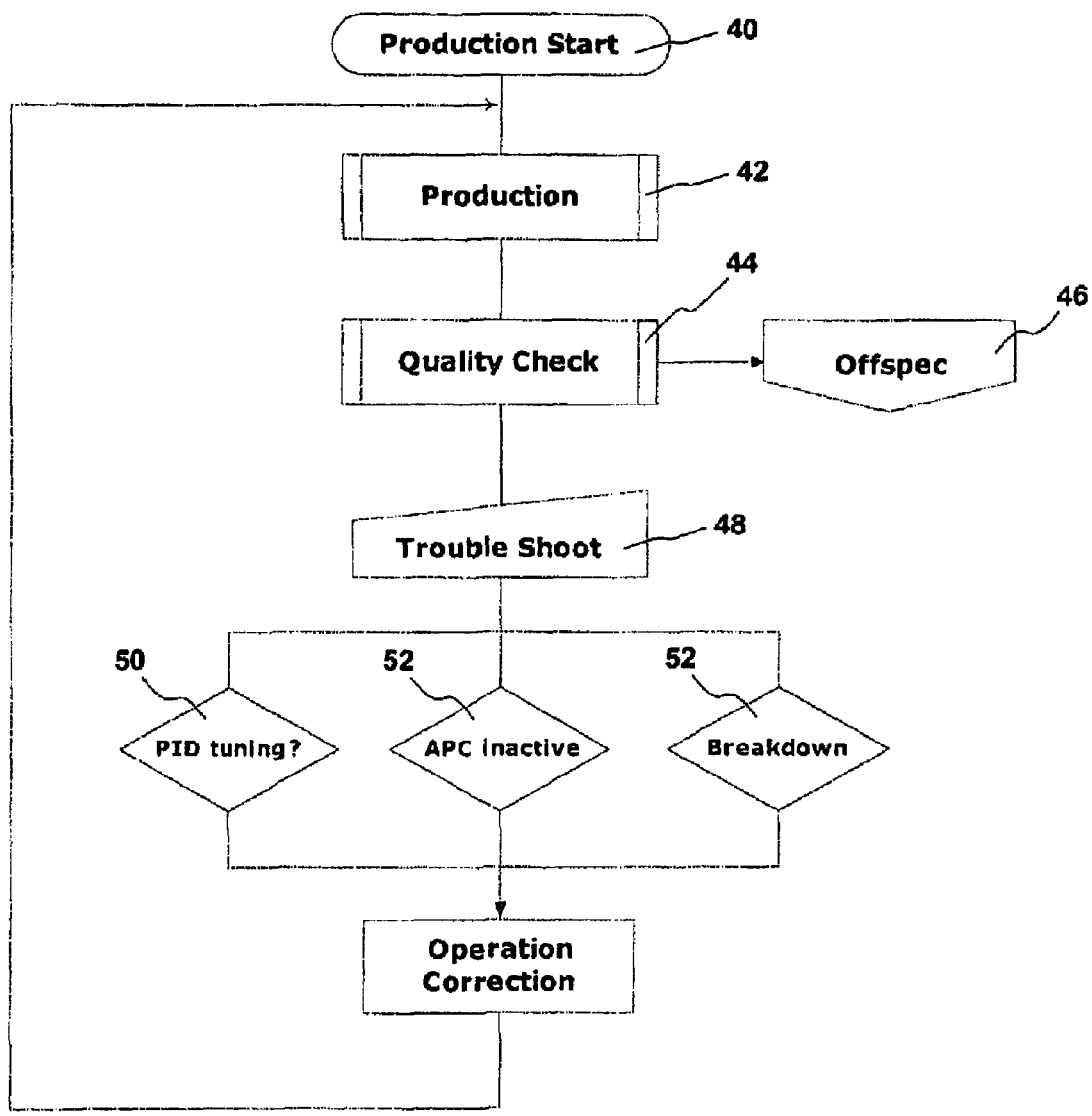
FIG. 1 is a flow diagram illustrating a typical prior art system.
Figure 2:
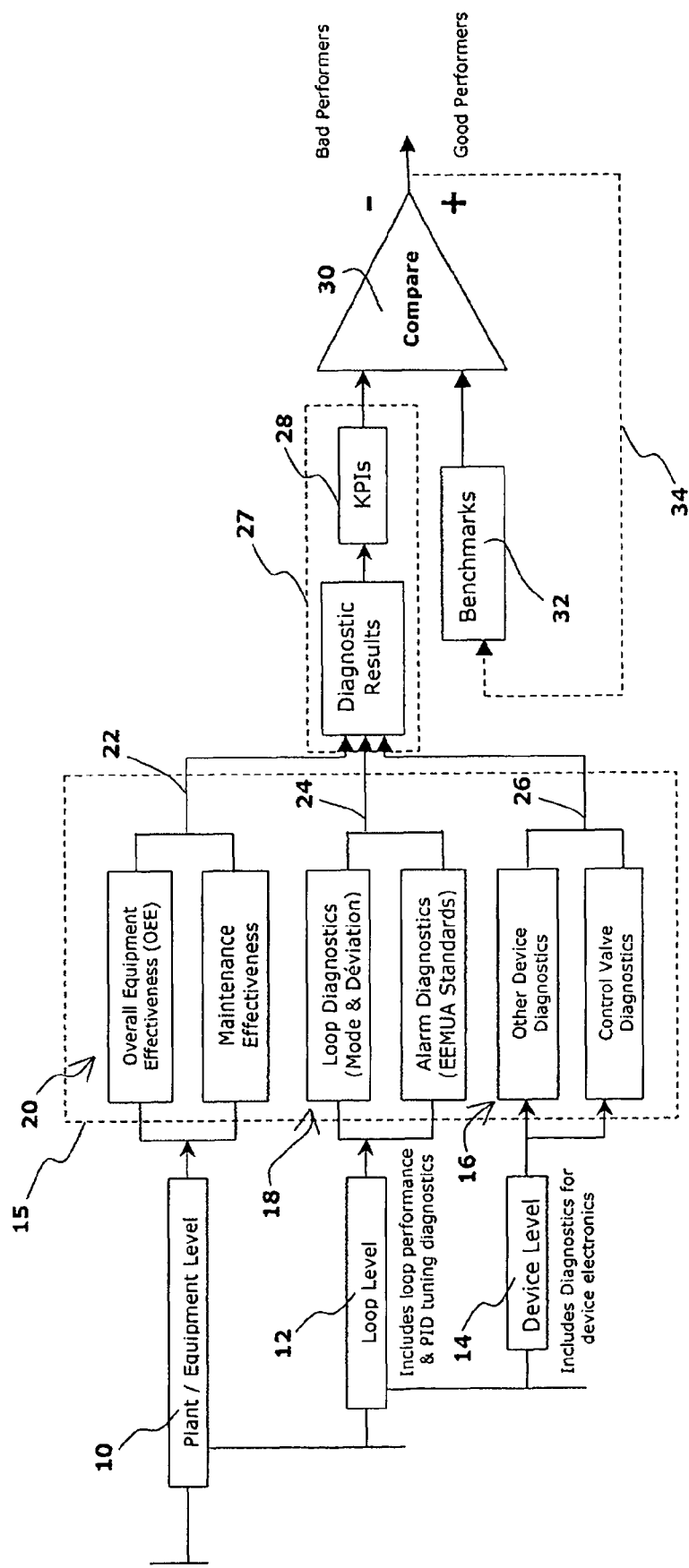
FIG. 2 is a block diagram illustrating the system of the present invention.

Referring to FIG. 2, diagnostics are performed at plant level 10, loop level 12 and device level 14 by diagnostic means 15. For example, at the device level, factors such as the device healthiness, device and process interface, and the deviation between design condition and actual process conditions are formulated in diagnostic step 16, and algorithms for the diagnostics are derived for example, from a combination of the equipment suppliers specifications and end users experience. At the loop level, various factors which influence quality and quantity of production are diagnosed in step 18. At the plant or equipment level, methods such as Overall Equipments Effectiveness (OEE) or other known methods are modelled in step 20 to monitor production downtime as a factor of asset performance, production quality or turnaround.

The diagnostic results 22, 24 and 26 of each of the three levels are converted by a converting means 27 into respective KPIs 28. The KPIs 28 are then transmitted to comparator 30 which compares them against predetermined benchmarks 32. Those performing at or above the benchmarks are then identified as "good performers" versus those below as "underperformers". The performance levels of the former are then transmitted through feedback loop 34 to become the revised, current benchmarks for future comparison with newly sensed and analyzed outputs from the three levels.

In addition to determining the problem; i.e. the underperformer(s), the performance levels of all of the other devices, loops and equipments are continuously determined and displayed for monitoring by the operators, and other personnel. For example, data such as quality and production rate may be segregated and displayed to personnel such as management and on-line operators, while the operators may also see other operating data such as that at the device and loop level. FIGS. 3, 4 and 5 further illustrate this important feature as the segregated data may be displayed and viewed by three or more different types of personnel such as Management, Engineering and Operators, each of which groups is interested in entirely different types of data illustrated by way of example.

Figure 6:
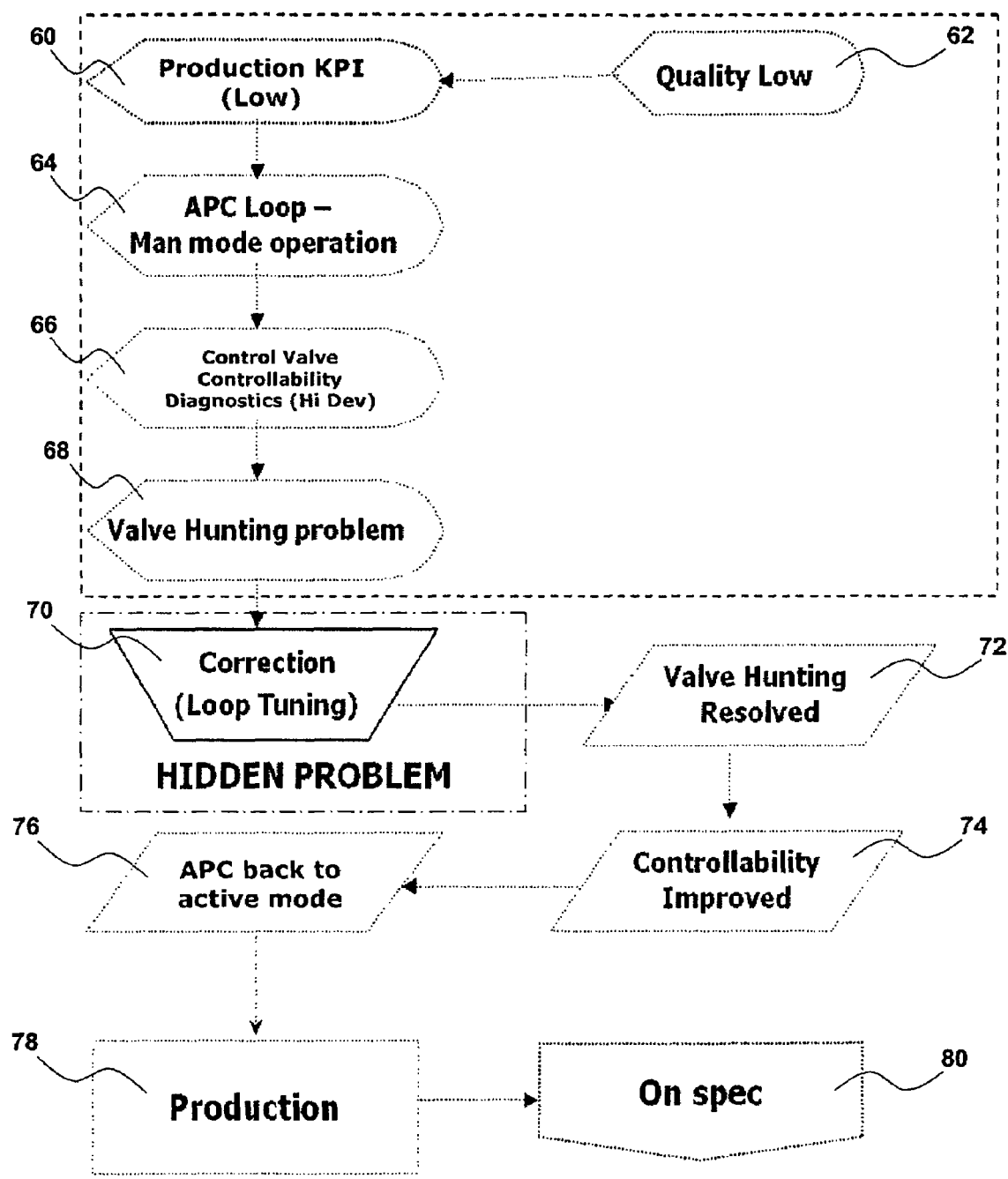
FIG. 6 is a flow diagram illustrating the metric based performance monitoring system of the present invention in further detail.

A further example is shown in FIG. 6 in which a user may use the present invention to manage plant performance KPI as previously described. In this scenario, the production KPI 60 for a given day is determined to be lower than the target, or lower than that of the previous day as illustrated at 62. The user then uses the present invention to go to the next lower level; i.e. the loop level and identifies that the APC loops are operating in manual mode with the APC inactive as shown at 64. Control valve controllability diagnostics are then used to identify that the control valve has been experiencing high deviation from the set point as shown at 66, thereby forcing it to hunt as is displayed on the interface as shown at 68. That is, the valve hunting has affected the production quality, and therefore, lowered the production KPI which has been brought to the user's attention by the present invention. The user is therefore able to identify a cause-effect relationship between the device and control loop diagnostics to take the necessary corrective actions.

Accordingly, the problem has been determined to require correction of the loop tuning, as shown at 70. The valve hunting is thus solved at 72, and the controllability 74 is improved with the APC back to active mode at 76. The production 78 is then on spec as shown at 80. The present invention is therefore capable of allowing the user to identify the area for improvement by observing a correlation between the equipment, loop and device diagnostics.

Figure 7:
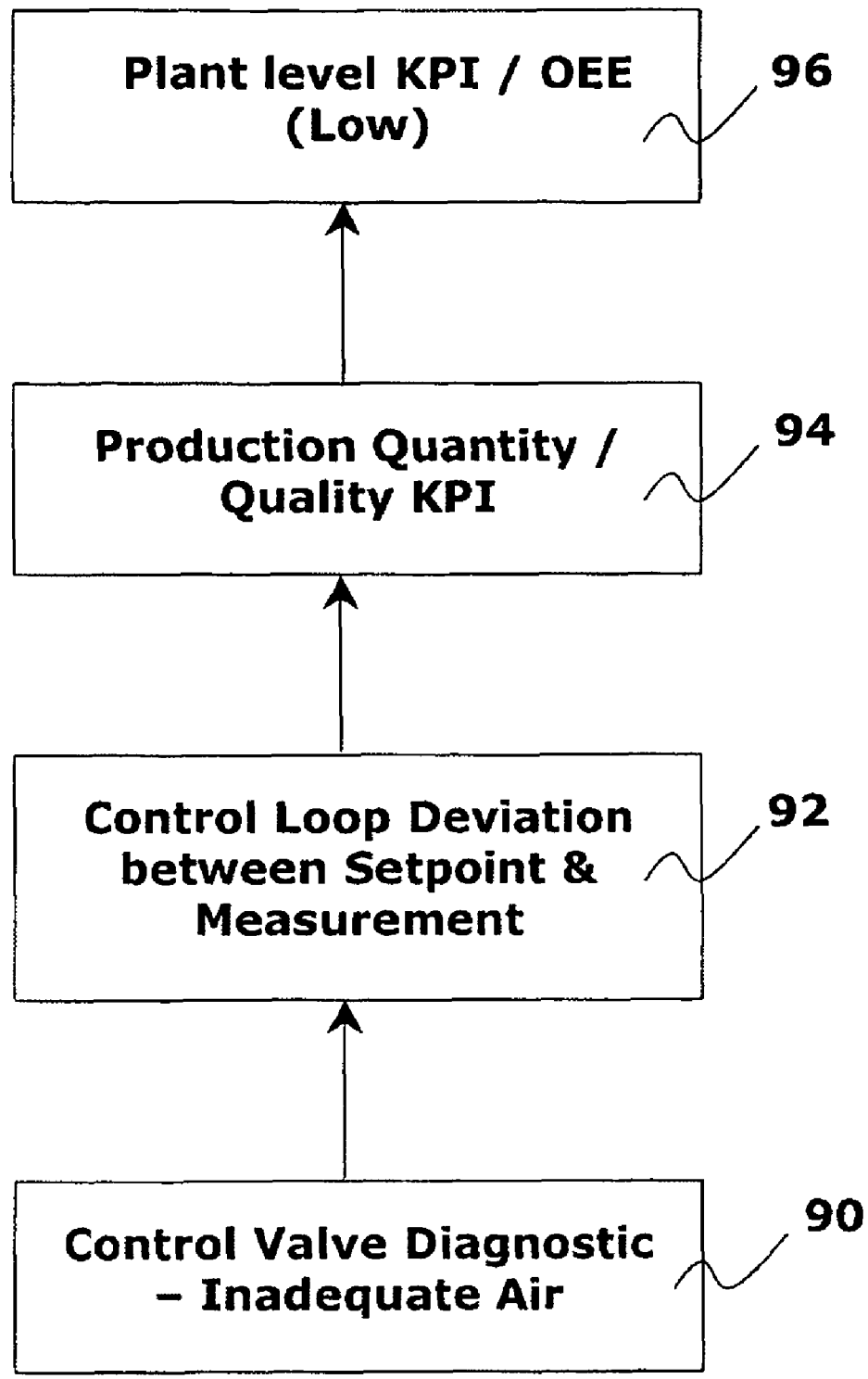
FIG. 7 is a flow diagram illustrating the metric based performance monitoring system in a bottom up mode.

In another aspect of the present invention, as shown in FIG. 7, it will be assumed that there is a problem of inadequate air supply to one of the control valves which is displayed on the user interface at 90. The personnel also see, at the loop level, that there is a deviation in the corresponding control loop between the set point and measured value as illustrated at 92. Additionally, it is seen that there is an effect on the production quantity or quality KPI at 94, and the overall effect on the KPI of the entire plant as shown at 96. Therefore, it will be apparent that the present invention provides monitoring the plant in both a bottom up as well as the top down mode.

In the foregoing examples it will be noted that the entire sequence is performed while the production continues, whereas in the previous example of the prior art, the user is not made aware of the identity of the problem until after there has been a device or equipment failure, after which more production time is lost in trouble shooting by trial and error.

From the foregoing description of one embodiment of the invention, it will be apparent that numerous variations will be apparent to those skilled in the art without departing from the spirit and scope of the invention. Accordingly, it is to be understood that the foregoing description is intended to be illustrative of the principles of the invention rather than exhaustive thereof, and that the true invention is not intended to be limited thereby, nor limited in scope other than as expressly set forth in the following claims.

The invention claimed is:

1. A method of monitoring the performance of a plant including devices, control loops and equipment comprising:
   a. performing diagnostics from a device level, to a control loop level and then to an equipment level;
   b. converting results of the diagnostics of each of said levels into respective Key Performance Indicators (KPIs);
   c. comparing said KPIs with predetermined operating benchmarks for each of the said devices, control loops and equipment;
   d. determining, using a comparator, performance levels of each of said devices, loops and equipment based on said comparing; and
   e. displaying the performance level as only three levels of performance.

2. The method of claim 1 including the step of displaying said performance levels to plant personnel.

3. The method of claim 2 including the step of displaying different performance levels to different plant personnel.

4. The method of claim 2 including the step of colour coding said performance levels.

5. The method of claim 1 wherein the displayed levels correspond to performance levels as being excellent, good but deteriorating or bad.

6. The method of claim 1 including the step of continuing plant production while performing steps a-e.

7. A system for monitoring the performance of a plant including devices, control loops and equipment comprising:
   a. a diagnostic means for performing diagnostics from a device level, to a control loop level and then to an equipment level;
   b. a converting means for converting results of the diagnostics of each of said levels into respective Key Performance Indicators (KPIs);
   c. a comparing means for comparing said KPIs with predetermined operating benchmarks for each of said devices, control loops and equipment, and based on said comparing, for determining performance levels of each of said devices, loops and equipment; and
   d. a displaying means for displaying the performance level as only three levels of performance.

\* \* \* \* \*